US011162762B2

(12) United States Patent
Clermont et al.

(10) Patent No.: US 11,162,762 B2
(45) Date of Patent: Nov. 2, 2021

(54) TURRET SIMULATION METHOD AND DEVICE

(71) Applicant: CMI DEFENCE S.A., Loncin (BE)

(72) Inventors: Bernard Clermont, Fleron (BE); Pierre Balthasart, Sprimont (BE); Patrice Bastiaens, Embourg (BE)

(73) Assignee: CMI DEFENCE S.A., Loncin (BE)

( * ) Notice: Subject to any disclaimer, the term of this patent is extended or adjusted under 35 U.S.C. 154(b) by 447 days.

(21) Appl. No.: 16/066,678

(22) PCT Filed: Dec. 16, 2016

(86) PCT No.: PCT/EP2016/081552
§ 371 (c)(1),
(2) Date: Jun. 28, 2018

(87) PCT Pub. No.: WO2017/114671
PCT Pub. Date: Jul. 6, 2017

(65) Prior Publication Data
US 2018/0356187 A1    Dec. 13, 2018

(30) Foreign Application Priority Data
Dec. 30, 2015   (BE) .................................. 2015/5852

(51) Int. Cl.
*F41G 3/26* (2006.01)
*G09B 9/00* (2006.01)
(Continued)

(52) U.S. Cl.
CPC ............... *F41G 3/26* (2013.01); *G09B 9/003* (2013.01); *G09B 9/04* (2013.01); *F41H 7/02* (2013.01)

(58) Field of Classification Search
None
See application file for complete search history.

(56) References Cited

U.S. PATENT DOCUMENTS 4,789,339 A * 12/1988 Bagnall-Wild ....... F41G 3/2644
434/16
6,166,744 A * 12/2000 Jaszlics .................. G06T 17/00
345/421
(Continued)

FOREIGN PATENT DOCUMENTS

CA    2266915 A1    10/1999
EP    0947797 A2    10/1999
(Continued)

OTHER PUBLICATIONS

B-Computer, Telephony and Electronics Glossary and Dictionary, www.csgnetwork.com/glossaryb.html#BUS, pp. 1-13 (Year: 2021).*
(Continued)

*Primary Examiner* — Nathan Hillery
(74) *Attorney, Agent, or Firm* — Leydig, Voit & Mayer, Ltd.

(57) ABSTRACT

An immersive simulation method for coaching and training a crew in the use of an armoured vehicle turret having a control computer, acquisition interfaces for commanding equipment units of the turret, and rendering interfaces for presentation of data to the crew, the control computer, acquisition interfaces, and rendering interfaces being connected to each other by computer bus, includes: connecting the control computer to a simulation computer, to which the control computer communicates a status of the turret; producing, using the simulation computer, a virtual environment, and presenting, using the rendering interfaces, the virtual environment at least in part to the crew. One or more motorised equipment units of the turret are in operation. Commands entered by the crew via the acquisition interfaces are transmitted to the operating motorised equipment units. Movements of the equipment units brought about by the
(Continued)

commands are used to produce optical, auditory, and/or acceleration sensations.

19 Claims, 3 Drawing Sheets

(51) Int. Cl.
*G09B 9/04* (2006.01)
*F41H 7/02* (2006.01)

(56) References Cited

U.S. PATENT DOCUMENTS

| | | | |
|---|---|---|---|
| 8,758,016 B1* | 6/2014 | Henriksson | G09B 9/04 |
| | | | 434/29 |
| 8,920,172 B1* | 12/2014 | Wilmink | G09B 9/003 |
| | | | 434/19 |
| 2002/0078138 A1* | 6/2002 | Huang | H04L 41/22 |
| | | | 709/203 |
| 2004/0018481 A1* | 1/2004 | Smith | G09B 9/08 |
| | | | 434/365 |
| 2006/0183083 A1* | 8/2006 | Moran | F41A 33/00 |
| | | | 434/11 |
| 2006/0183084 A1* | 8/2006 | Ramboyong | F41A 33/00 |
| | | | 434/11 |
| 2007/0287133 A1* | 12/2007 | Schubert | F41G 3/26 |
| | | | 434/11 |
| 2009/0081619 A1* | 3/2009 | Miasnik | F41J 2/02 |
| | | | 434/21 |
| 2011/0076648 A1* | 3/2011 | Lindheim | G09B 9/05 |
| | | | 434/38 |
| 2014/0272805 A1* | 9/2014 | Klein | G09B 19/00 |
| | | | 434/16 |

FOREIGN PATENT DOCUMENTS

| | | |
|---|---|---|
| EP | 1715285 A1 | 10/2006 |
| EP | 2418635 A2 | 2/2012 |
| FR | 2420737 A1 | 10/1979 |
| GB | 2017276 B | 7/1982 |

OTHER PUBLICATIONS

Bus Definition & Meaning | What is Bus?, https://www.webopedia.com/definitions/bus/, p. 1 (Year: 2021).*
Definition of bus | PCMag, https://www.pcmag.com/encyclopedia/term/bus, pp. 1 and 2 (Year: 2021).*
Online Jargon, Acronyms, and Texting Shorthand :-) | NetLingo.com, https://www.netlingo.com/dictionary/b.php 1/ (Year: 2021).*

* cited by examiner

TURRET SIMULATION METHOD AND DEVICE

CROSS-REFERENCE TO PRIOR APPLICATIONS

This application is a U.S. National Phase application under 35 U.S.C. § 371 of International Application No. PCT/EP2016/081552, filed on Dec. 16, 2016, and claims benefit to Belgian Patent Application No. BE 2015/5852, filed on Dec. 30, 2015. The International Application was published in French on Jul. 6, 2017 as WO 2017/114671 A1 under PCT Article 21(2).

FIELD

In a general sense, the invention relates to an immersive simulation method for coaching and training a crew in the use of an armoured vehicle turret. The invention relates in addition to a turret configured for the implementation of this method.

BACKGROUND

In order to coach and train military personnel in the use of the turrets mounted on to armoured vehicles, it is a known practice to use simulators on a personal computer where the user is confronted with various scenarios.

It is also a known practice to use the vehicle as such as a simulation space. These simulations referred to as "embedded" simulations provide the ability to adhere as closely as possible to the real conditions on the ground. In addition to their potential for greater realism, embedded simulations have the advantage that they allow the use of reserve material resources. With respect to armoured vehicles, it is a fact that in times of peace, only a small portion of the fleet of vehicles is operational and used mainly for manoeuvres on the ground, the rest of the vehicles being parked in hangars and depots. Thanks to the embedded simulations, it is possible to exploit these inactive resources for the purposes of coaching and training at costs that are far more reasonable than those incurred for the acquisition and maintenance of a fleet of hardware—based simulators offering a degree of realism as close as possible to the actual systems.

Document FR 2 420 737 describes a device for the training of the gunner of an armoured vehicle where the vehicle is used as a simulator. In this device, an image representing the target is projected in the optical sight system of the gunner. By operating the sight joystick, the user can sight and pursue the represented target. In order to optimally reproduce the actual conditions, the device can be equipped with loudspeakers in order to simulate the sounds of the vehicle. Furthermore, the device is suitable for superposing movements of the target in the sight system that simulate the independent movement of the vehicle on a more or less rugged terrain.

Thereafter, a more developed training method for armoured vehicles was disclosed in document EP 0 947 797 A2. In this document, a simulation computer is connected to the central computer of the vehicle and, in simulation mode, the screens of the vehicle show the simulation data processed by the central computer and by the simulation computer as well as the data relating to the functions that are activated by the trainee. In simulation mode, all the operational and movement related functions of the vehicle, such as those of the engine, direction, armaments, etc, are blocked whereas all the acquisition interfaces of the vehicle remain operational. In this device, it is incumbent only on the simulation computer to take charge of the computation of the new status of the system on the basis of the entries made by the trainee. This has the disadvantage of requiring that all the operating functions be replicated in the simulation computer.

Document EP 1 715 285 A1, which is critical of this drawback, proposes a solution whereby the simulation computer sends the simulation data to the central computer and the latter calculates the new status of the system.

However, there remains a drawback both in the case of the device described in document EP 0 947 797 A2 as well as the one in document EP 1 715 285 A1 that the realism of the simulation leaves much to be desired.

Document EP 2 418 635 teaches an alternative to the system described in document EP 0 947 797 A2, which is better suited to older armoured vehicles, in particular armoured vehicles which are not equipped with a computer bus system.

Document U.S. Pat. No. 4,789,339 describes a portable training equipment unit that can be connected to an armoured vehicle so as to make the armoured vehicle serve as interface between the simulation and the crew.

SUMMARY

In an embodiment, the present invention provides an immersive simulation method for coaching and training a crew in the use of an armoured vehicle turret, the turret comprising a control computer, acquisition interfaces for commanding equipment units of the turret, and rendering interfaces for presentation of data to the crew, the control computer, acquisition interfaces, and rendering interfaces being connected to each other by a computer bus, the method comprising: connecting the control computer to a simulation computer, to which the control computer is configured to communicate a status of the turret; producing, using the simulation computer, a virtual environment, and presenting, using the rendering interfaces, the virtual environment at least in part to the crew; one or more motorised equipment units of the turret being in operation; transmitting commands entered by the crew via the acquisition interfaces to the motorised equipment units that are in operation, and using movements of the equipment units brought about by the commands to produce optical, auditory, and/or acceleration sensations; and simulating movements of the armoured vehicle bearing the turret in the virtual environment using a simulator for a driver station of the armoured vehicle, the simulator for the driver station being located apart from the armoured vehicle and being connected to the simulation computer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

A first aspect of the invention relates to an immersive simulation method for coaching and training a crew in the use of an armoured vehicle turret that produces stimuli for several types of human sensory perceptions. It is assumed that the turret comprises a control computer, as well as acquisition interfaces for commanding equipment units of the turret and rendering interfaces for the presentation of data to the crew, the control computer as well as the acquisition interfaces and the rendering interfaces being connected to each other by means of a computer bus (or digital bus). The method comprises the following actions:

the control computer is connected to a simulation computer, to which the control computer communicates the status of the turret;

the simulation computer produces a virtual environment which is presented at least in part to the crew by means of the rendering interfaces;

one or more motorised equipment units of the turret are in operation; and the commands entered by the crew via the acquisition interfaces to the motorised equipment units that are in operation are transmitted to the latter, such that the movements of these equipment units that are brought about by these commands induce in the crew sensations of an optical or auditory nature, and/or of acceleration.

In the context of the present document, the term "acquisition interface" is used to refer to any device that makes it possible for the crew (or to only a part of the crew) to enter a command or data in the equipment unit of the turret, for example, a button, a wheel, a joystick, a keyboard, a motion sensor, a microphone with speech recognition, etc. The term "rendering interface" is used to refer to any device by which the turret (or one of its components) can communicate in the reverse direction, that is to say, to the crew. Examples of rendering interfaces are screens, indicator lights, system status signals, loudspeakers, acoustic signalers, etc. It should be noted that certain interfaces, that are "combined interfaces", are both acquisition interfaces as well as rendering interfaces within the meaning of this document, for example touch screens, force-feedback joysticks, etc.

The term "connected" means, in the context of this document, being "communicatively linked". The connection may be done in wired or wireless mode, unless it is otherwise stated in the context.

The term "equipment unit" is used to refer to any device or assembly of devices being part of the turret and which carries out a certain function and, depending on the case, related functions. A "motorised equipment unit" is an equipment unit that is actuated by a motor. The motor may either form part of the motorised equipment unit or be separate. Unless specifically mentioned otherwise, the term "equipment unit" may refer to either a motorised or non-motorised equipment unit.

Thanks to the invention, it is possible to subject turret crews to simulations having an extremely high level of realism, which previously could not have been achieved other than by manoeuvres on the ground. However, such manoeuvres require an enormous amount of time, people, equipment, and space and are not without consequences on the environment or on the lifespan of the equipment used for the training. The invention thus makes it possible not only to reduce by a significant degree the costs of training on a per crew or per person basis, but also to significantly improve the level of control of the weapon. An additional advantage of the invention lies in the fact that there is no need for the turret to undergo any modification of its settings that are necessary for normal operation (outside of the simulation) which averts any influence of the simulation mode on the normal operation mode.

It will be appreciated that, in a manner quite contrary to the teaching of documents EP 0 947 797 A2 and EP 1 715 285 A1, at least one motorised equipment unit of the turret, preferably several, and even more preferably all the motorised equipment units, are in operation during the simulation and thus respond through movements to the commands that concern them which are input by the crew. The movements, in their turn, produce optical (visual) effects, acoustic (auditory) effects and/or acceleration effects as well as, among the members of the crew, the sensations that are related thereto. The realism of the simulation is significantly improved. Preferably, the effects induced are a combination of several of the above-mentioned effects, for example, a combination of optical and auditory effects, a combination of auditory and acceleration effects, a combination of optical, acoustic, and acceleration effects. The acceleration effects comprise, in particular, vibrations.

Preferably, one of the motorised equipment units of the turret that are in operation in simulation mode or the plurality of them comprise one or more of the following: the cannon elevation mechanism, the sight system, the ammunition rack, the turret rotation system, the turret stabilisation system, and the smoke extraction system.

Although it is so preferred in order to enhance the realism of the simulation, the motorised equipment units of the turret are not necessarily all in operation during the simulation. For example, the azimuthal rotation mechanism for the turret could be blocked (for reasons related to space, security, or other factors). In simulation mode, the turret may thus comprise equipment units (motorised or non-motorised) that are deactivated. However, the deactivated equipment units are preferably presented as operational to the crew (except when simulating failure of an equipment unit). According to a particularly realistic embodiment of the simulation, the turret is fully operational, that is to say, all the equipment units (whether or not motorised) are in operation.

According to one embodiment of the simulation method, commands entered by the crew via the acquisition interfaces to equipment units that seem to be in operation but are in fact deactivated are transmitted to the simulation computer that generates a simulated reaction of the equipment units to these commands. The simulated reaction is presented to the crew by means of the rendering interfaces.

The turret may comprise sensors that provide data pertaining to the exterior of the turret (for example a camera, a lidar, a radar, a thermometer, atmospheric sensors, satellite positioning system, etc) in case of normal operation of the turret. When the turret is used in simulation mode, the simulation computer provides data pertaining to the virtual environment that replace the data from such sensors. This does not mean that these sensors are necessarily turned off in simulation mode. For example, in simulation mode, the control computer and/or the simulation computer can be configured to ignore or overwrite the data originating from sensors that have not been turned off.

The turret may also comprise sensors that operate normally in simulation mode and the data of which are not irregular compared to the normal operation of the turret. In simulation mode, the data from sensors that operate normally may be transmitted to the simulation computer in the context of the communication of the status of the turret such that the simulation computer is able to take the same into account for the simulation.

Preferably, if there are sensors that, in simulation mode, produce errors or irregular data on account of the deactivation of one or more equipment units, the simulation computer provides simulated data which replace the errors or irregular data from these sensors.

According to an embodiment of the simulation method, movements of the armoured vehicle bearing the turret in the virtual environment are simulated by means of a simulator for the driver station of the armoured vehicle, the simulator for the driver station being connected to the simulation computer. Preferably, the simulator for the driver station is separate from the armoured vehicle. The simulator for the driver station may be a replica (that is more or less realistic) of the driver station of the armoured vehicle, or in a simpler implementation, a PC (personal computer) or a simplified interface that provides the ability to monitor the progress of the armoured vehicle. In this configuration, the simulation method comprises, on the one hand, an embedded simulation component for the crew of the turret and, on the other hand, a simulation component on a simulation station.

According to an advantageous embodiment of the method, the virtual environment generated by the simulation computer comprises an avatar of the turret and/or of the armoured vehicle, which is piloted, during the simulation, by the crew of the turret and/or of the armoured vehicle.

The simulation computer may comprise or be connected to a network of simulation computers.

According to an embodiment of the simulation method, the simulation computer is connected to the control computer of at least another turret. Preferably, all the connected turrets share the same virtual environment and the same scenario. It is therefore possible to simulate exercises involving multiple armoured vehicles and their turrets. The crews are thus able to train to act in formation.

The simulation computer may be connected to one or more instructor stations where the activities of the turret are monitored and from where the course of the simulation may be created, influenced, and/or recorded. In case of networked simulation, each turret or armoured vehicle may have its own dedicated instructor. If necessary, the recording of the simulation may be used during a debriefing of the crew. In the context of one such debriefing, the recording (the "film") of the simulation may be reproduced in front of the crew. The avatar of the turret makes it possible in this context to represent (to view) the actions carried out by the crew, with the instructor being able to comment thereupon.

According to a preferred embodiment of the simulation method, the rendering interfaces comprise screens, which, in case of normal operation of the turret, display the images from the sight cameras, but which in the simulation method display images of the virtual environment, which are generated taking into account the position and orientation of the sight cameras in the virtual environment.

The virtual environment produced by the simulation computer may comprise a geographical environment, meteorological conditions and, possibly, entities or avatars denoting friendly, enemy or neutral presences (for example other armoured vehicles). The avatars can be piloted by other participants in a networked exercise or by the simulation computer.

A second aspect of the invention relates to an armoured vehicle turret that is suitable for being used in the simulation method described above. One such turret comprises a control computer, equipment units, of which one or more are motorised, as well as acquisition interfaces for commanding the equipment units and at least a rendering interface for the presentation of data to the crew. The control computer is configured so as to place the turret, following a triggering event, in a simulation mode in which:

the control computer connects to a simulation computer, and if the connection is successfully established, communicates the status of the turret to the simulation computer;

the rendering interfaces show data relating to a virtual environment;

one or more motorised equipment units of the turret are in operation; and the commands entered via the acquisition interfaces to the motorised equipment units that are in operation are transmitted to the latter, such that the movements of these equipment units that are brought about by these commands produce effects of an optical or auditory nature, and/or of acceleration.

Some examples of equipment units being in operation in simulation mode have been cited above.

The triggering event that activates the simulation mode may be the detection of a connection between the control computer and an interface box or between the control computer and a simulation computer. Preferably, the control computer verifies the authenticity of the interface box of the simulation computer before placing the turret in simulation mode. The control computer can be configured so as to place the turret, following the detection of a disconnection of the interface box or of the simulation computer, back into its normal operating mode.

A third aspect of the invention relates to a simulation system, comprising an armoured vehicle turret such as described above, a simulation computer for producing the virtual environment, and a simulator for the driver station of the armoured vehicle bearing the turret in the virtual environment, the simulator for the driver station being located apart from the armoured vehicle (and the turret) and connected to the simulation computer.

The turret simulators known in the state of the art all have certain drawbacks, because the immersion of the crew in the scenario of the exercise is not complete. The simulators on PC have the disadvantage that the members of the crew do not work in the conditions that prevail within a turret and therefore cannot familiarise themselves at the time of the simulation with the particularities that are involved in the actual handling of the equipment of the turret. The existing embedded simulators, on the other hand, offer a level of realism that leaves much to be desired. Crew members are therefore unable to completely immerse themselves in the conditions of narrow confinement and stress encountered in the event of a real conflict, given that the inadequacies of the current simulations leave too much room for imagination.

The embodiment of the invention that is subsequently discussed relates to a simulation system and method for coaching and training a crew in the use of a turret mounted on to an armoured vehicle.

In order to be able to exploit inactive material resources and attain a level of realism that is unmatched to this day, use is made of a real turret that is in operation and that is not a replica. The turret is connected to a simulation computer, which provides a virtual reality in which the exercise takes place and the crew pilots an avatar of the armoured vehicle with its turret. While the turret becomes the interface with this virtual reality for the crew of the turret (typically a commander and a gunner), the driver of the armoured vehicle bearing the turret takes up position on a separate simulation station, from where he commands the functions specific to the vehicle, while also being an actor in the simulation exercise by interacting with the crew members of the turret. During a simulation, the crew find themselves confined within the turret and are exposed to stimuli which result, on the one hand, from the presentation of the virtual environment and, on the other hand, from the interaction with the real equipment units in the turret, some of which, preferably most, and possibly all of which, are in operation. In the context of this illustration of the invention, it will be assumed that the motorised equipment units in operation comprise, in particular: the cannon elevation mechanism, the sight system, the ammunition rack, and the smoke extraction system. As they are in operation, the manipulation of these equipment units involves no difference for the crew as compared to the normal operation of the turret. In particular, these equipment units produce the usual noises and vibrations that the crew can therefore feel and which contribute to the realism of the exercise.

Figure 1:
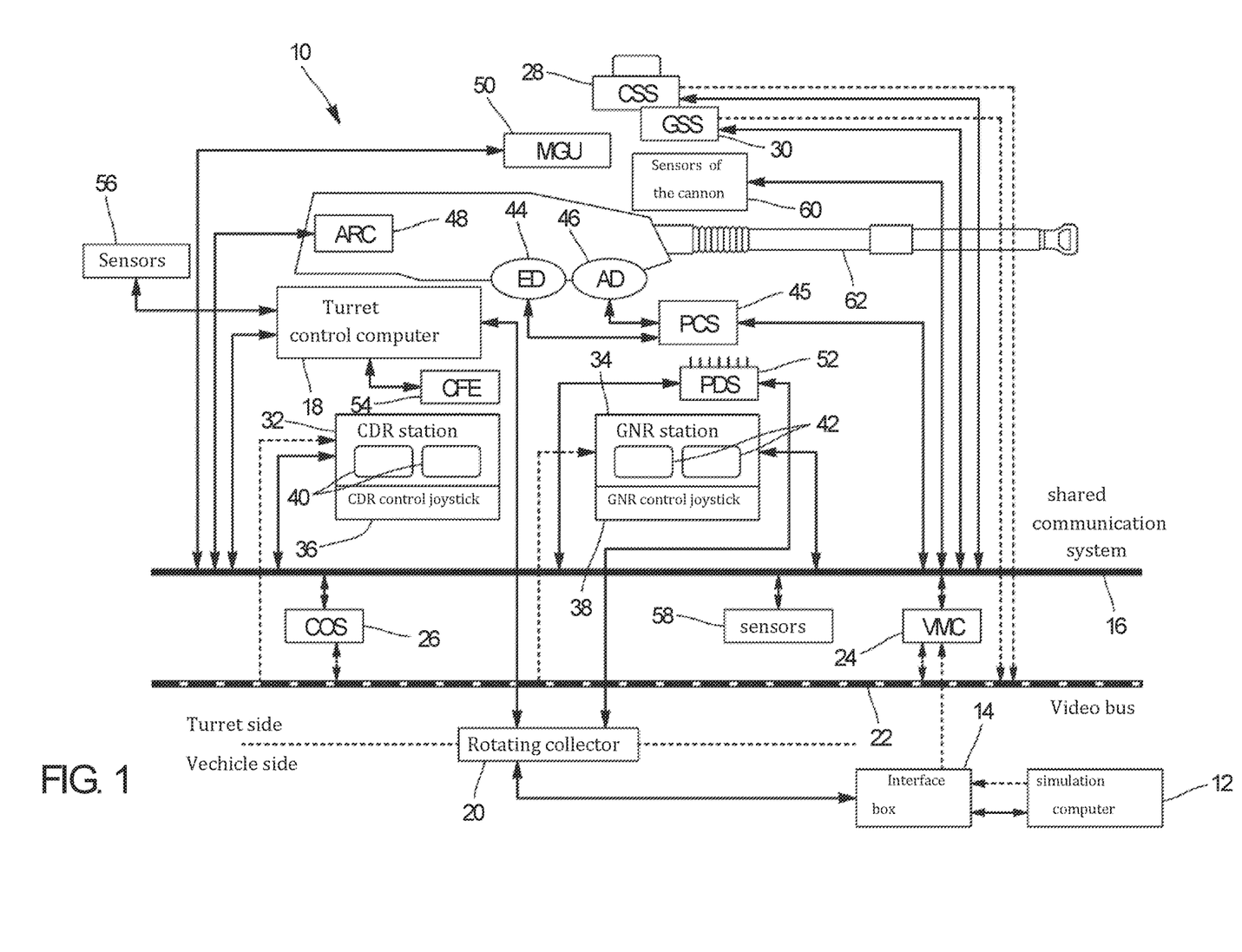
FIG. 1: A diagram illustrating the communication system of a turret that is connected to a simulation computer.

FIG. 1 diagrammatically shows how the turret 10 is connected to the simulation computer 12. The passage of the turret 10 from the normal operating mode to a "simulator" mode is done by means of an interface box 14, which is connected to the shared communication system 16 (to the computer bus) of the turret 10 and which links the latter to the simulation computer 12.

In the example illustrated in FIG. 1, the interface box 14, or SEI ("Simulator Embedded Interface"), is connected to the control computer 18 (TNC, "turret network controller") via the rotating collector 20 of the turret 10. The simulation computer 12 can thus "listen" to all the messages that are exchanged on the shared communication system 16 and inject therein its own messages via the control computer 18. The interface box 14 is also connected to the video bus 22 of the turret 10 by means of a video multiplexer 24 (VMC, "video matrix controller"). This broadband video connection is used by the simulation computer to inject images of the virtual environment, intended to replace the images provided by the cameras 26, 28, 30 of the turret 10.

The turret 10 comprises various equipment units that are controlled or monitored by the control computer 18, acquisition interfaces and rendering interfaces. The acquisition interfaces comprise, in the example shown in FIG. 1, all the buttons, wheels, etc, of the commander station 32 (CDR, "commander") and the gunner station 34 (GNR, "gunner"), including the respective control joysticks for the turret 36 and 38. The rendering interfaces comprise, in this example, in particular the screens 40, 42 at the stations 32, 34 of the commander, and the gunner respectively. The equipment units of the turret 10 comprise, in the example shown, the elevation mechanism for the cannon 44 (ED, "elevation drive"), the azimuthal rotation mechanism for the cannon 46 (AD, "azimuth drive"), both coupled to a power control system 45 (PCS, "power control system"), an ammunition rack controller system 48 (ARC, "ammunition rack control"), a missile guidance system 50 (MGU, "missile guidance unit"), a power distribution system 52 (PDS, "power distribution system"), one or more equipment units provided by the customer 54 (CFE, "customer furnished equipment"), as well as various sensors 56, 58, 60, 26, 28, 30 which may be connected to the computer bus 16 or directly to the control computer 18.

In the normal operation of the turret 10, the screens 40, 42 are used to display the images provided by the different cameras, which comprise the camera 28 of the sight system of the commander (CSS, "commander sight system"), the camera 30 of the sight system of the gunner (GSS, "gunner sight system") and one or more cameras for close observation 26 (COS, "close observation system"). The video data flow over the video bus 22 under the control of the video multiplexer 24, which is itself controlled by the control computer 18 of the turret 10.

The sensors, which, in case of normal operation of the turret 10, provide data pertaining to the external environment of the turret, comprise, among others, the cameras 26, 28, 30. When the turret 10 is used in simulation mode, the simulation computer 12 provides images of the virtual environment that replace the images from these cameras 26, 28, 30. To this end, the simulation computer produces computer-generated images of the virtual environment while at the same time taking into account the position and orientation of the turret 10 on the simulation terrain and the position and orientation of the cameras in the frame of reference of the turret 10. The videos thus obtained are encoded in the video format used by the turret and put on the video bus 22 of the turret via the video multiplexer 24. In simulation mode, the control computer 18, by making use of the video multiplexer 24, switches the different videos provided by the simulation computer 12 on to the channels "listened to" by the different screens 40, 42 and by the sight systems CSS/GSS, so as to replace the videos provided by the cameras 26, 28, 30. The cameras 26, 28, 30 can be turned off by the control computer 18 in simulation mode. However, if they remain active, the videos they produce are ignored.

With regard to the other sensors that provide data pertaining to the exterior of the turret 10, their data are also replaced by data relating to the virtual environment, which are produced by the simulation computer 12. Like the cameras 26, 28, 30, these sensors can be switched off in simulation mode. If some of them remain active in simulation mode, the control computer 18 prevents the data originating from these sensors from being taken into account by an equipment unit of the turret and replaces them with the respective data from the simulation computer 12.

The turret 10 comprises other sensors that operate normally in simulation mode, because the physical quantities that they monitor are not dependent upon the external environment. Such sensors may be found in particular in the acquisition interfaces and in certain equipment units (either motorised or not), for example, to determine the position of a moving part, the temperature at a certain place, the level of a fluid, etc. In simulation mode, the data from these sensors are transmitted to the simulation computer 12 that takes the same into account for the simulation. For example, thanks to such data, the simulation computer 12 is informed of the status of the turret 10, including the position and orientation of the turret 10, the elevation of the cannon 62 as well as the position and orientation of the cameras 26, 28, 30.

The simulation mode is automatically triggered by the control computer 18 when it detects that the interface box 14 is connected. The switching over from the normal operating mode to the simulator mode, and vice versa, is therefore done very quickly by virtue of connecting or disconnecting the interface box 14. In switching over into simulation mode, the control computer tries to connect to the simulation computer 12. Once the connection is established, it is synchronised with the simulation computer 12. It also deactivates all the equipment units that are not supposed to be operating in simulation mode. In particular, for safety reasons, the control computer 18 inhibits firing. However, as described above, some motorised equipment units, in particular the cannon elevation mechanism, the sight system, the ammunition rack, and the smoke extraction system, remain or are placed in operation by the control computer

18. It should be noted that the deactivation or activation of certain equipment units may depend on the type of armament of the turret. For example, a large calibre cannon is typically loaded by means of a motorised rack while a medium calibre cannon comprises a passive (non motorised) rack. Preferably a motorised ammunition rack is in operation during the simulation, even if it does not carry any ammunition (for the simulation use can also be made of dummy ammunition). A medium calibre cannon can be cycled empty during the simulation. Lastly, the control computer 18 modifies the configuration settings of the turret so as to take control over the communication from or to deactivated equipment units, divert the communication to the simulation computer 12, respectively.

As a consequence thereof, the crew members of the turret are confronted with a virtual reality that comprises realistic external conditions on the ground as well as atmospheric/weather conditions (visibility, wind, rain, . . . ). In addition, the turret is presented to the crew in its operational state. The equipment units react, or seem to react, to the actions of the crew as if the turret were actually on the virtual terrain. In particular, the motorised equipment units that are in operation produce the stimuli, among others the noises, the vibrations, and the visual impressions that are expected by the crew in actuating these equipment units. For example, once the sight system is locked on a (virtual) target, it will force the orientation system of the cannon to follow the target. If the vehicle bearing the turret is (virtually) in motion, the orientation system of the cannon will compensate for the (virtual) movement of the vehicle with a real movement, which is perceptible by the crew.

For even greater realism, it is possible to use additional rendering interfaces, which are not included in the equipment units of the turret. For example it would be possible to mount the turret on to a table that generates vibrations simulating the movement of the turret in the virtual environment, or vibrations resulting from the virtual weather conditions, etc.

Figure 2:
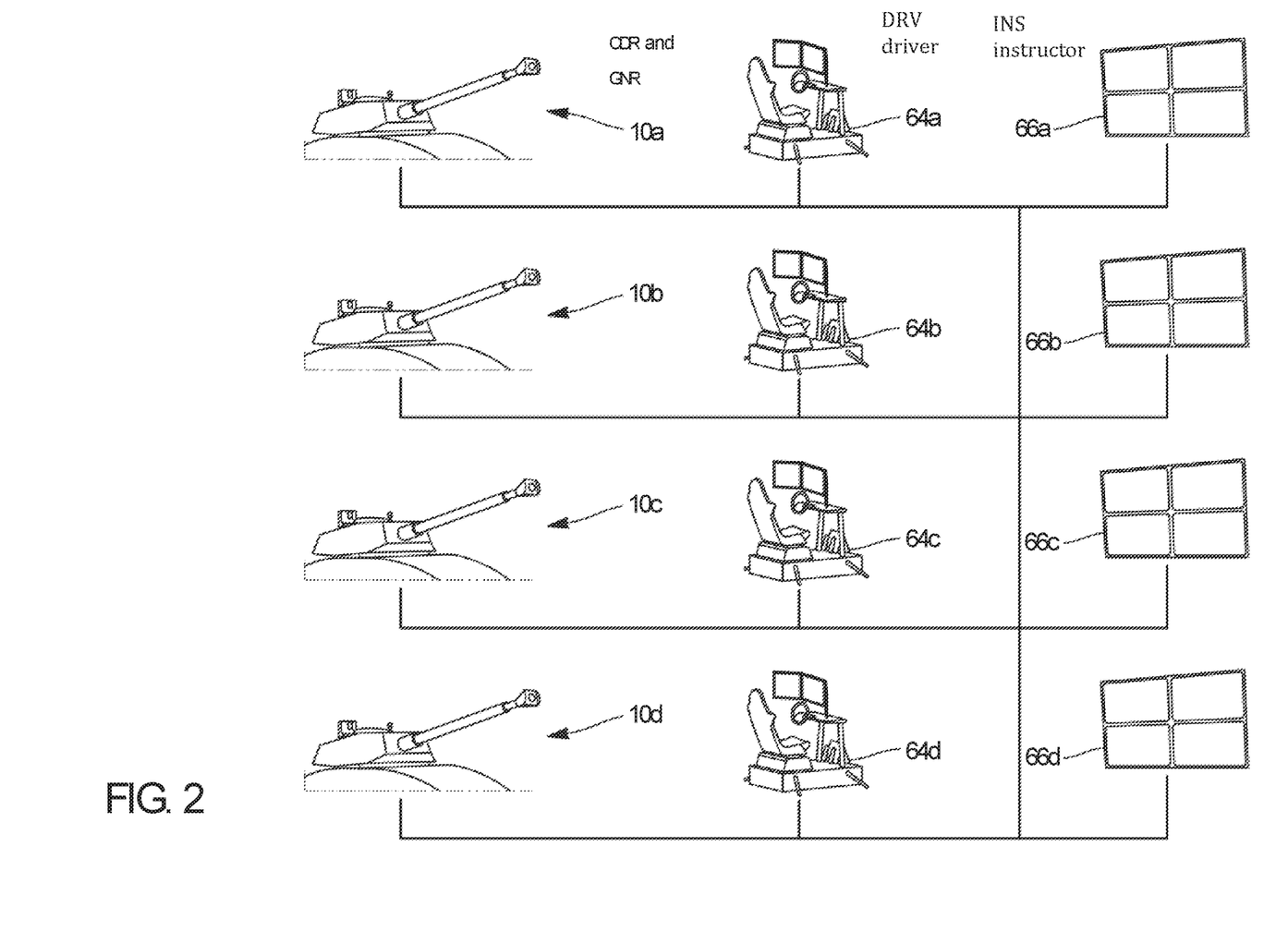
FIG. 2: A very simplified diagram showing several turrets, driving station simulators and instructor station simulators that are network connected.
Figure 3:
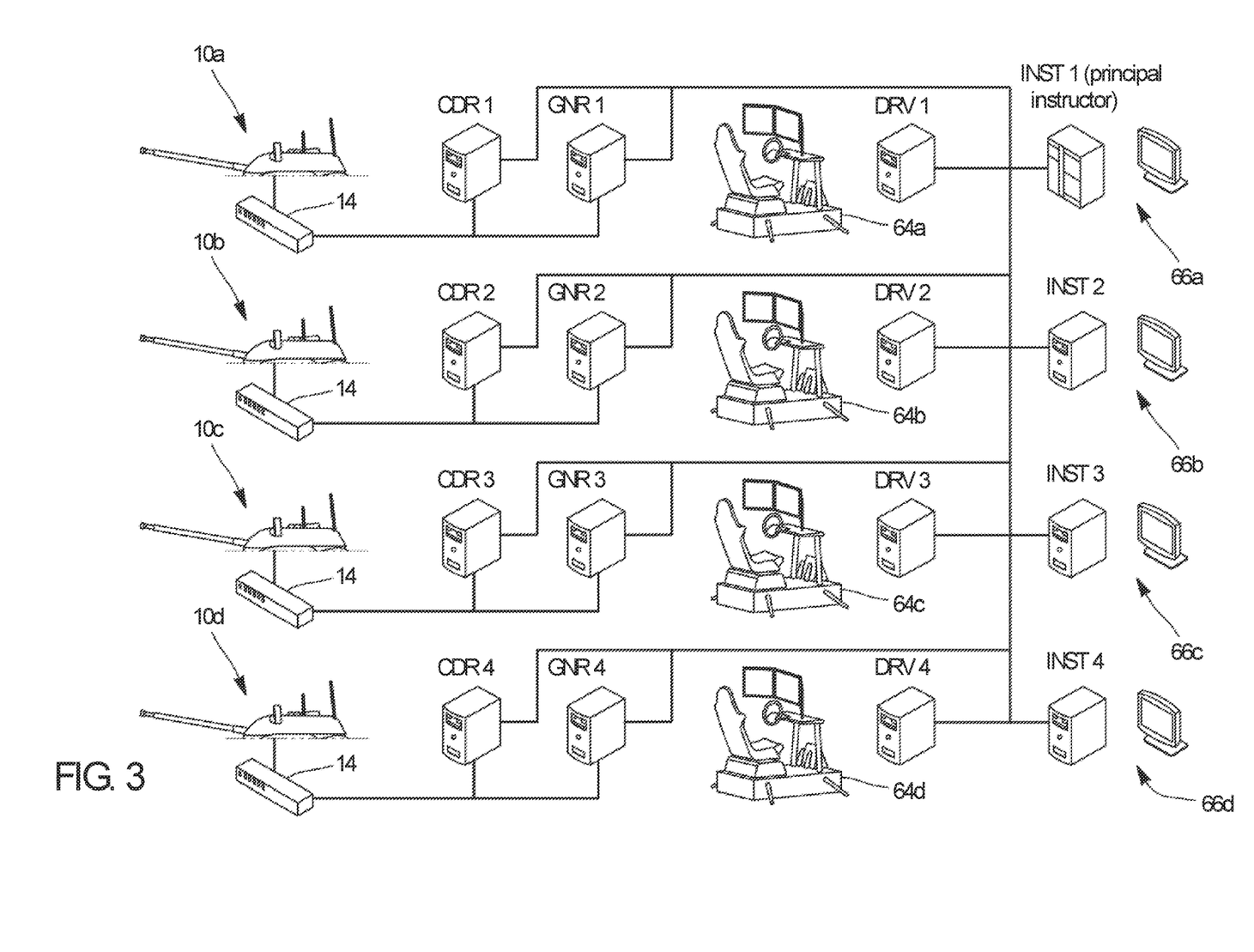
FIG. 3: A more detailed diagram of an example of the network shown in FIG. 2.

FIGS. 2 and 3 show several turrets 10a, 10b, 10c, 10d; driver station simulators 64a, 64b, 64c, 64d and instructor stations 66a, 66b, 66c, 66d that are network connected. The simulation computer or the simulation computer network is not shown in FIG. 2, but a possible architecture for the system is illustrated in FIG. 3. Each turret is associated with a driver station simulator, from which the avatar of the armoured vehicle is piloted in the virtual reality generated by the simulation computer(s). The actions of the crew of each armoured vehicle, that is to say, in the example shown, of the commander and the gunner installed in the turret and of the driver (DRV, "driver") installed in the associated simulator, can be monitored by an instructor (INST, "instructor") from the respective instructor station. The instructor also has the opportunity to influence the course of the simulation, for example, by giving orders to the crew, triggering actions of the enemy, causing failures, etc.

All the turrets, simulators and instructor stations can share the same virtual environment and the same scenario. In this way, it is possible to conduct virtual manoeuvres having an extremely high level of realism. The virtual environment comprises a terrain (including therein the relevant wildlife, flora and possible constructed structures), meteorological conditions (wind, precipitation, visibility, etc.), the avatars of the armoured vehicles and possibly other avatars controlled by artificial intelligence.

FIG. 3 shows a possible network architecture. A master simulation computer, for example, the one used by the principal instructor INST 1, generates the parameters that define a virtual environment shared by all the members of the network. The simulation-related computations are distributed over several computers that are synchronised with each other. Thus, each driver station simulator comprises a dedicated computer. In the illustrated network, there is also a simulation computer for each commander station and for each gunner station. In this manner, in particular the computations for rendering the part of the virtual environment seen by each member of the crew can be distributed in an efficient manner, and a level of visual realism can be attained. However, it should be noted that it is possible to consolidate the tasks of multiple computers in one single computer if the computing power of the latter is sufficient.

While specific embodiments have just been described in detail, the person skilled in the art will appreciate that it is possible for various modifications and alternatives to these embodiments to be developed in the light of the overall teaching provided by this present disclosure of the invention. As a consequence thereof, the specific methods and/or arrangements described therein are thus supposed to be given only by way of illustration, with no intention to limit the scope of the invention, which is determined by the extent of the related claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An immersive simulation method for coaching and training a crew in the use of an armoured vehicle turret, comprising:

providing an actual armoured vehicle with a rotating turret and a vehicle body, the rotating turret being connected to the vehicle body via a rotating collector, the turret comprising a control computer, acquisition interfaces for commanding equipment units of the turret, rendering interfaces for presentation of data to the crew, a shared communication system comprising a computer bus, and a video bus, the control computer, acquisition interfaces, and rendering interfaces being connected to each other by the computer bus and the video bus, and the vehicle body comprising an embedded simulation computer;

providing a simulator for a driver station of the armoured vehicle, located apart from the armoured vehicle;

connecting the control computer to a simulation computer;

connecting the simulator to the simulation computer;

using the control computer to communicate a status of the turret to the simulation computer;

producing, using the simulation computer, a virtual environment, and presenting, using the rendering interfaces, the virtual environment at least in part to the crew;

one or more motorised equipment units of the turret being in operation;

transmitting commands entered by the crew via the acquisition interfaces to the motorised equipment units that are in operation, and using movements of the equipment units brought about by the commands to produce optical, auditory, and/or acceleration sensations; and simulating movements of the armoured vehicle bearing the turret in the virtual environment using the simulator, wherein connecting the simulation computer to the control computer is performed using an interface box connected to the control computer via the rotating collector and to the video bus by a video multiplexer.

2. The method according to claim 1, wherein the commands entered by the crew via the acquisition interfaces to equipment units that seem to be in operation but are in fact deactivated are transmitted to the simulation computer to generate a simulated reaction of the equipment units to these commands, and wherein the simulated reaction is presented to the crew by the rendering interfaces.

3. The method according to claim 1, wherein the simulation computer provides data pertaining to the virtual environment that replace data from sensors, which, if the turret functions normally, provide data pertaining to an exterior of the turret.

4. The method according to claim 1, wherein data from sensors that operate normally are transmitted to the simulation computer in the context of a communication of the status of the turret.

5. The method according to claim 1, wherein the simulation computer provides simulated data that replace data from sensors, which produce errors or irregular data on account of a deactivation of one or more equipment units.

6. The method according to claim 1, wherein the simulation computer comprises or is connected to a network of simulation computers.

7. The method according to claim 1, wherein the simulation computer is connected to a control computer of at least one other turret, and wherein the armoured vehicle turret and the at least one other turret share the same virtual environment.

8. The method according to claim 1, wherein the simulation computer is connected to at least one instructor station where the activities of the armoured vehicle turret are monitored and from where a course of the simulation may be influenced.

9. The method according to claim 1, wherein the rendering interfaces comprise screens, which, in case of normal operation of the armoured vehicle turret, display images from sight cameras, but which in the simulation method display images of the virtual environment, which are generated taking into account a position and orientation of the sight cameras in the virtual environment.

10. The method according to claim 1, wherein the virtual environment produced by the simulation computer comprises a geographical terrain and meteorological conditions.

11. The method according to claim 1, wherein the control computer is at least indirectly connected to the simulation computer via the computer bus.

12. The method according to claim 1, further comprising using the control computer to detect when the control computer is connected to the simulation computer and to place the armoured vehicle turret into a simulation mode.

13. The method according to claim 12, wherein the control computer verifies an authenticity of the interface box of the simulation computer before placing the armoured vehicle turret in the simulation mode.

14. The method according to claim 12, wherein the control computer, when placing the armoured vehicle turret into the simulation mode, deactivates all equipment units that are not supposed to be operating in the simulation mode.

15. The method according to claim 12, further comprising using the control computer to detect when the control computer is disconnected from the simulation computer and to place the armoured vehicle turret back into a normal operation mode.

16. A simulation system, comprising:

an actual armoured vehicle with a rotating turret and a vehicle body, the rotating turret being connected to the vehicle body via a rotating collector, the turret comprising a control computer, equipment units, of which one or more are motorised, acquisition interfaces for commanding the equipment units, rendering interfaces for presentation of data to a crew, a shared communication system comprising a computer bus, and a video bus, the control computer, acquisition interfaces, and rendering interfaces being connected to each other by the computer bus and the video bus, the vehicle body comprising an embedded simulation computer configured to produce a virtual environment and being connected to the control computer by an interface box via the rotating collector and to the video bus by a video multiplexer; and a simulator for a driver station of the armoured vehicle bearing the turret in the virtual environment, the simulator being located apart from the armoured vehicle and being connected to the simulation computer, wherein the control computer is configured so as to place the turret, following a triggering event, into a simulation mode, wherein:

the control computer connects to the simulation computer, and if the connection is successfully established, communicates a status of the turret to the simulation computer;

the rendering interfaces present data relating to the virtual environment;

one or more motorised equipment units of the turret are in operation; and the commands entered via the acquisition interfaces to the motorised equipment units that are in operation are transmitted to the latter, such that the movements of these equipment units that are brought about by these commands produce optical, auditory, and/or acceleration effects.

17. The simulation system according to claim 16, wherein one of the motorised equipment units of the turret that are in operation in simulation mode or a plurality of them include one or more selected from the group consisting of a cannon elevation mechanism, a sight system, an ammunition rack, a turret rotation system, a turret stabilisation system, and a smoke extraction system.

18. The simulation system according to claim 16, wherein the triggering event of the simulation mode comprises detection of a connection between the control computer and the interface box or between the control computer and the simulation computer.

19. The simulation system according to claim 18, wherein the control computer is configured so as to place the turret, following detection of a disconnection of the interface box or of the simulation computer, back into a normal operating mode.

* * * * *